No. 796,268. PATENTED AUG. 1, 1905.
J. J. TROEGER.
SELF PROPELLING COMBINATION HARVESTING MACHINE.
APPLICATION FILED AUG. 16, 1904.
6 SHEETS—SHEET 2.
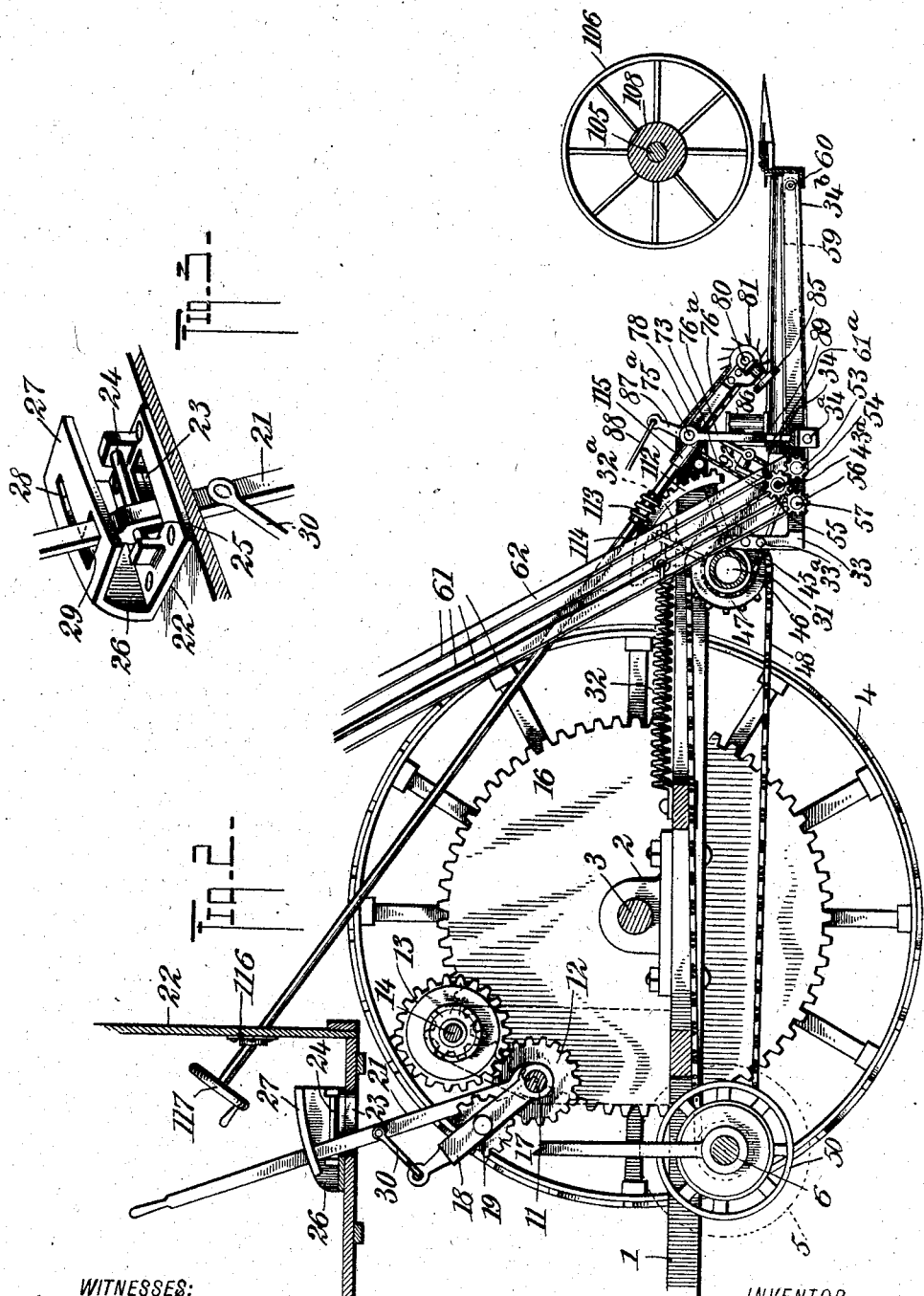
WITNESSES:
Geo. D. Kingsbury.
A. E. Fay.
INVENTOR
Jesse J. Troeger
BY
[signature]
ATTORNEYS

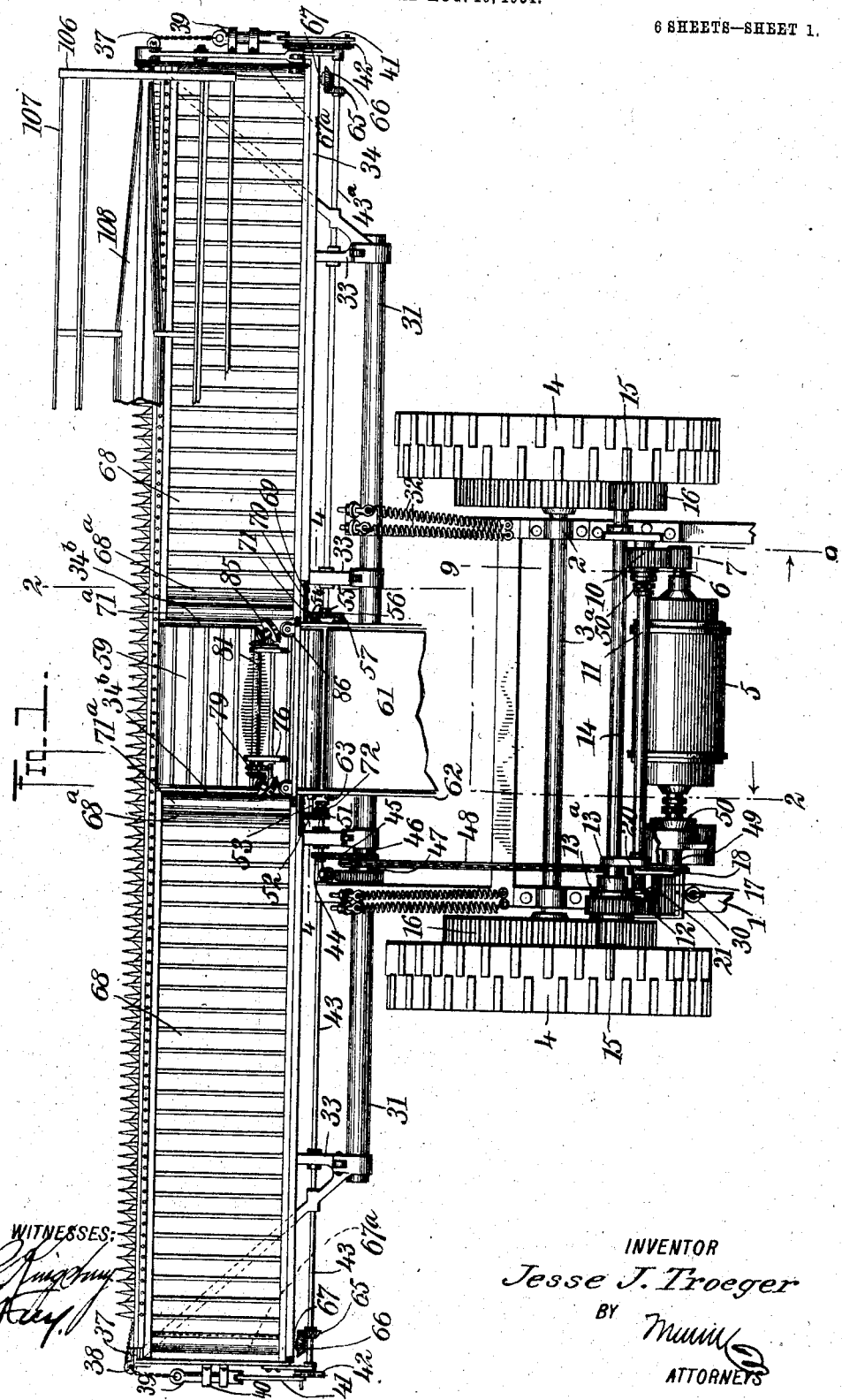

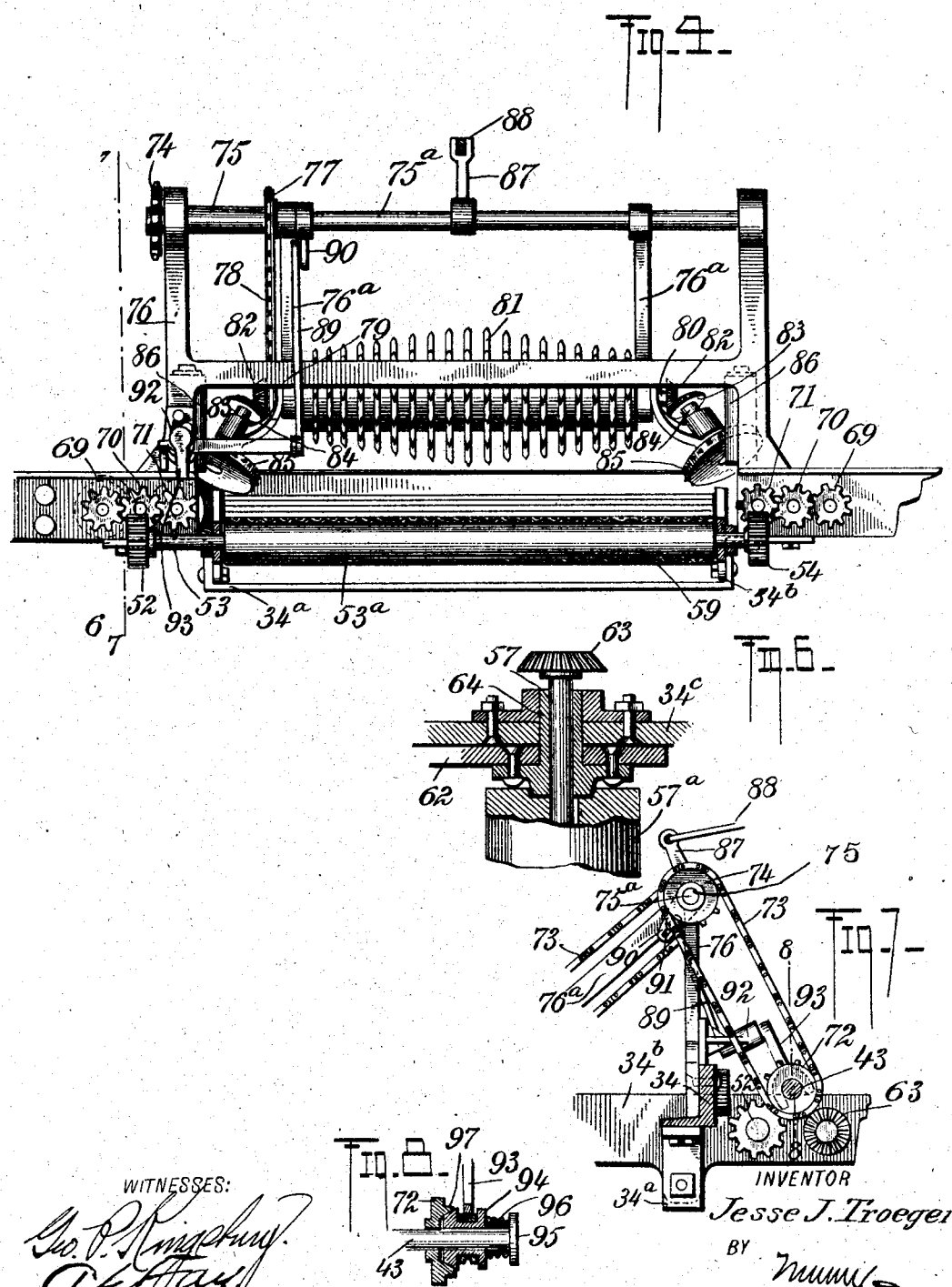

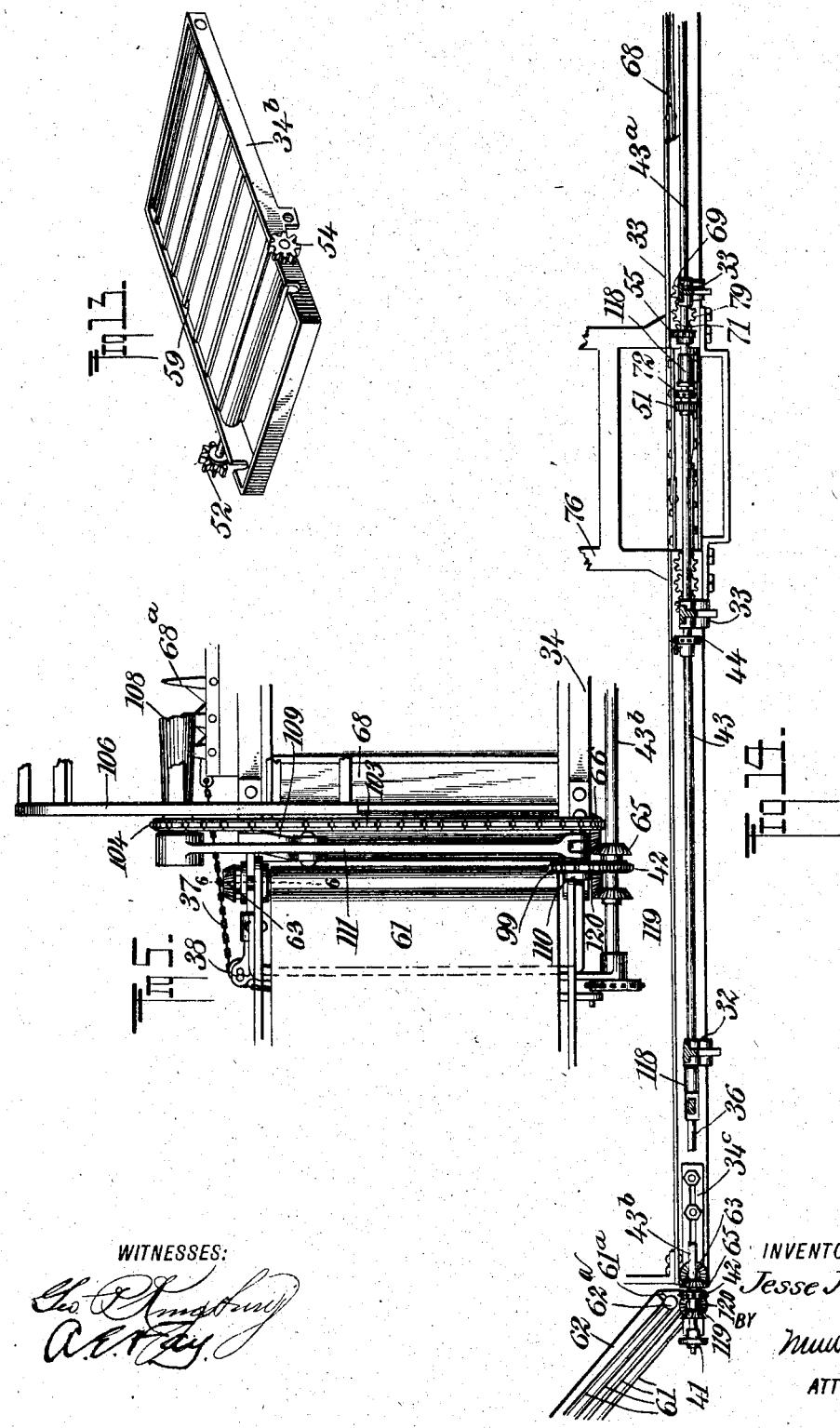

No. 796,268. PATENTED AUG. 1, 1905.
J. J. TROEGER.
SELF PROPELLING COMBINATION HARVESTING MACHINE.
APPLICATION FILED AUG. 16, 1904.
6 SHEETS—SHEET 5.
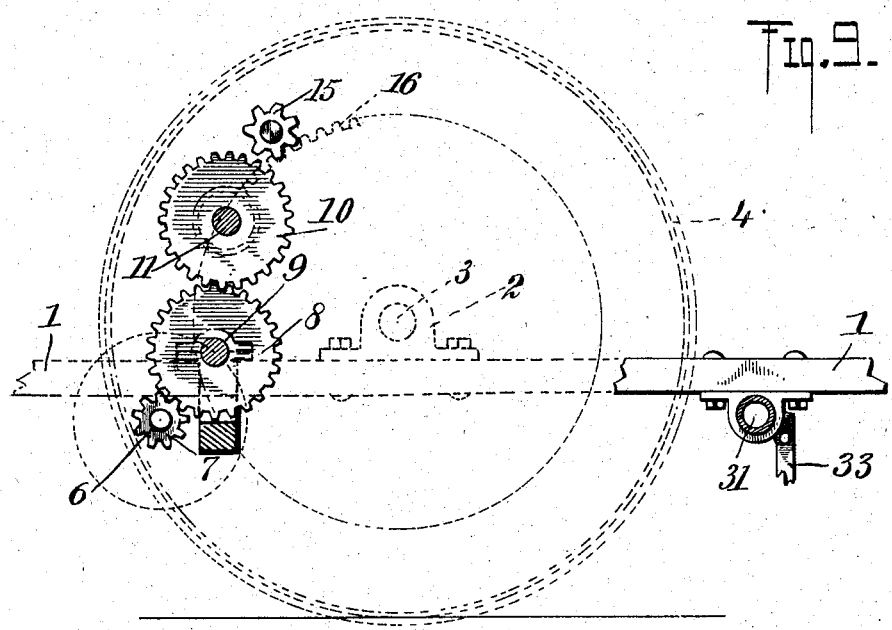
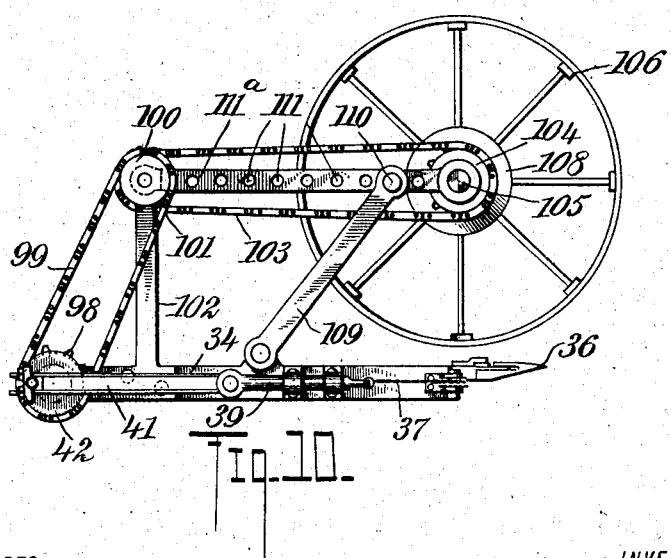
WITNESSES:
Geo. P. Kingsbury
A. E. Fay
INVENTOR
Jesse J. Troeger
BY
ATTORNEYS

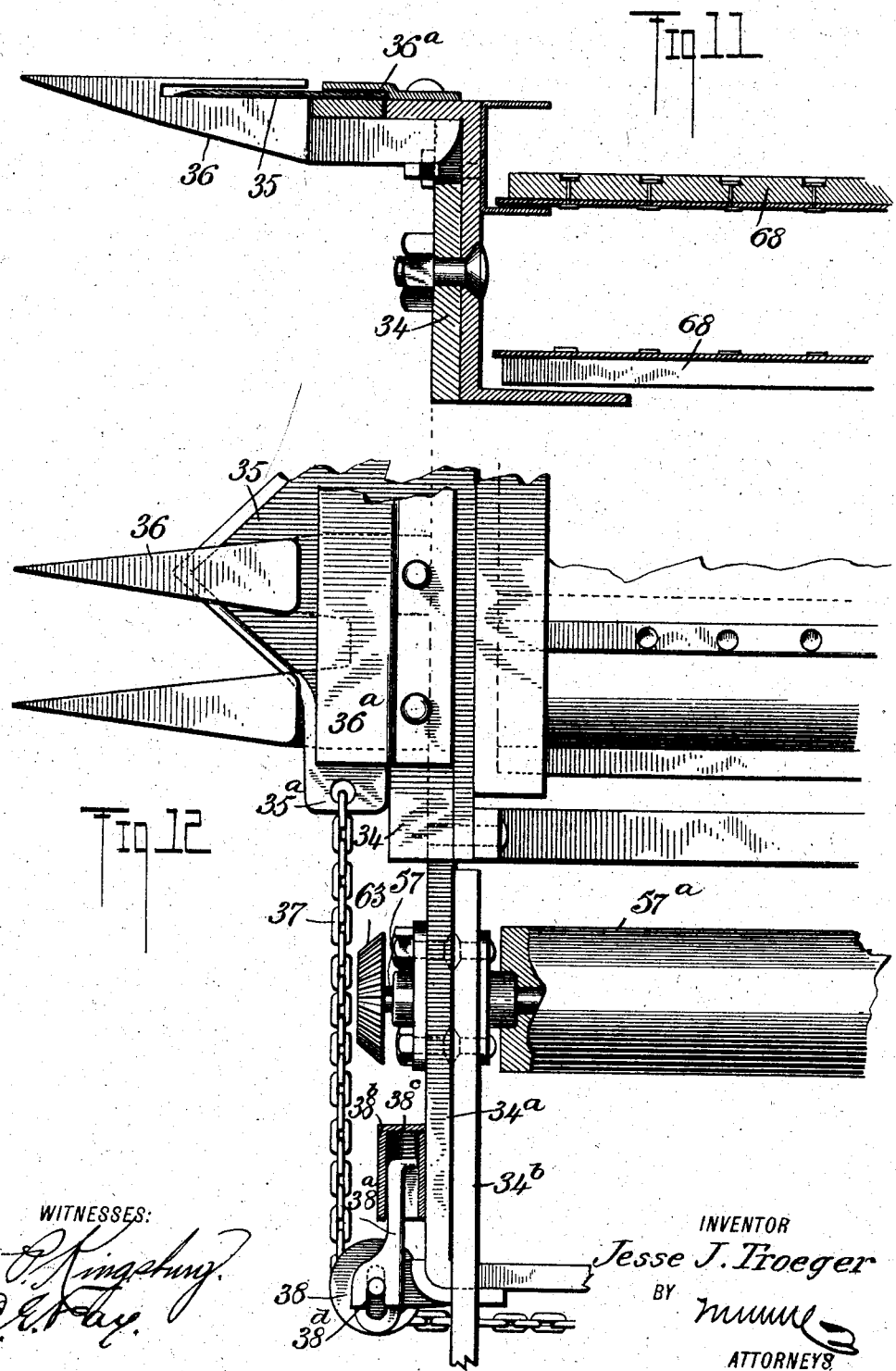

UNITED STATES PATENT OFFICE.

JESSE JEREMIAH TROEGER, OF CHICAGO, ILLINOIS.

SELF-PROPELLING COMBINATION HARVESTING-MACHINE.

No. 796,268.          Specification of Letters Patent.          Patented Aug. 1, 1905.

Application filed August 16, 1904. Serial No. 220,907.

*To all whom it may concern:*

Be it known that I, JESSE JEREMIAH TROEGER, a citizen of the United States, and a resident of Chicago, in the county of Cook and State of Illinois, have invented a new and Improved Self-Propelling Combination Harvesting-Machine, of which the following is a full, clear, and exact description.

My invention relates to a harvesting-machine, and comprises self-propelling means, a cutter, a reel, and means for conveying the cut material from the cutter and elevating it from the machine to a thresher, which is to be connected to it, an auxiliary force-feeding device for the conveyer, and other features which will be described below. It is to be understood that the invention relates to each of these features separately, as well as to the combination as a whole.

The elevator may be so placed as to receive material at the center of the machine from both ends thereof and elevate it to the thresher, and it can be placed at one end to deliver the material from the cutter or from a pile to a wagon placed alongside. The motor may also be disconnected and mounted in a stationary position, so as to be used for performing general work.

Further features and objects will be described in the course of this specification.

Reference is to be had to the accompanying drawings, forming a part of this specification, in which similar characters of reference indicate corresponding parts in all the figures.

Figure 1 is a plan view of a preferred form of my invention with parts broken away. Fig. 2 is a sectional view on the line 2 2 of Fig. 1. Fig. 3 is a perspective view of a detail. Fig. 4 is a sectional view on the line 4 4 of Fig. 1, showing the force-feeding device in end elevation. Fig. 5 is a plan view showing the left-hand end of the machine with the elevator applied thereto. Fig. 6 is a fragmentary sectional view, on an enlarged scale, on the line 6 6 of Fig. 5. Fig. 7 is a sectional view on the line 7 7 of Fig. 4. Fig. 8 is a fragmentary sectional view on the line 8 8 of Fig. 7. Fig. 9 is a diagrammatic view showing in section the gearing for operating the machine, taken on the line 9 9 of Fig. 1. Fig. 10 is an end elevation of the header, reel, and cutting mechanism. Fig. 11 is a transverse sectional view of the cutting device on an enlarged scale. Fig. 12 is a plan view of the same, showing one end only, with the parts in position ready for the attachment of the elevator. Fig. 13 is a perspective view of a detail; and Fig. 14 is a side view of the header, showing the elevator applied to the left end, parts being shown in section.

The frame 1 of the machine is provided with a pair of bearings 2, which support a shaft 3, carrying driving and supporting wheels 4 at its ends. In order to propel the machine over a field, mechanism is provided, which is illustrated in the present instance as comprising a motor 5 upon a shaft 6, which shaft is provided with a pinion 7, meshing with a gear 8, (see Fig. 9,) mounted upon a stud 9, which gear 8 in turn meshes with a gear 10 upon a shaft 11, parallel with the stud 9. These two shafts run from one side of the frame to the other, and the shaft 11 is provided with a pinion 12, which meshes with a gear 13 (see Fig. 2) upon a shaft 14. This shaft 14 is also provided with a pair of pinions 15 at each end thereof, preferably on the outside of the frame 1, which mesh with gears 16, fixedly secured to the driving-wheels 4. It will be obvious that the operation of the motor when the gearing is connected up in this manner will cause the machine to be propelled over the surface of the ground. It is to be understood that the two driving-wheels 4 are supplemented by other wheels (not shown) for the purpose of supporting the machine in stable equilibrium. It will also be understood that the various pinions and gears connecting the motor with the driving-wheels can be changed in any desired manner so as to produce the best results as to speed and power and that any changes in this connection come under the scope of my invention. A reversing mechanism for the driving-wheels is also provided for the purpose of permitting the machine to be driven backward. Meshing with the pinion 12 is a long gear 17, which is mounted in a frame 18 by means of a shaft 19. The pinion 12 is not fixedly secured to the shaft 11, but is provided with a keyway which engages with a key 20 on this shaft, so as to permit the pinion 12 to slide back and forth a certain distance upon the shaft 11. A lever 21 is provided for the purpose of accomplishing this movement of the pinion 12, and it will be obvious that when the pinion is shifted from the position shown in Fig. 1 to the right it will be disengaged from the gear 13, but will still be in engagement with the gear 17, which is long enough to provide for engagement with the pinion 12 in all positions of the latter. Consequently if the pinion 12 is shifted out of engagement with the gear 13 and the frame 18, which is pivoted upon the shaft 11, as indicated in Fig. 2, is swung inwardly upon its pivot until the gear 17 meshes with the gear 13 a reversal of the operation of the driving-wheels will be accomplished, because the third gear 17 has been introduced between the pinion 12 and the gear 13. The way of accomplishing this result which I have preferred is illustrated in Figs. 2 and 3.

22 represents the cab of the vehicle, to which all the operating-levers and the like are led. In the floor of the cab is a slot 23, above which is a rod 24. The lever 21 is provided with a slot 25, through which the rod 24 passes.

26 is a frame extending upwardly from the floor of the cab and provided with a horizontal portion 27, in which are a pair of slots 28 and 29, preferably at right angles to each other. The lever 21 is pivotally connected, by means of a link 30, to the frame 18. Now it will be obvious that the lever 21 is pivoted by means of the rod 24 and that the operation of the lever around this pivot and through the slot 29 will force the pinion 12 back and forth to accomplish the engagement and disengagement of the pinion with the gear 13. It will also be obvious that the lever 21 and frame 18 are pivoted on the shaft 11 and that the oscillation of the lever upon this pivot, guided by the rod 24 and slot 28, will cause the frame 18 to swing to and fro from the gear 13, so that the gear 17 may be caused to be engaged with or disengaged from the former.

On the forward part of the frame 1 is attached a shaft or cylinder 31, so arranged as to be capable of turning upon its own axis. This shaft is counterbalanced by means of springs 32 or their equivalent, attached to projections $32^a$ upon the shaft.

33 represents a series of hangers adjustably secured to the shaft 31 by means of bolts $33^a$. These hangers are designed for supporting a header 34. This header extends parallel with the motor-shaft across the front of the machine and, as indicated in Fig. 1, is preferably of considerable length, so as to extend beyond the driving-wheels in both directions. It is designed for supporting several of the harvesting devices, as will be brought out.

The knives or sickles 35, which are supported by the header and extend from one end to the other thereof, are provided with guards 36 and guide-plates $36^a$. These parts are secured in position as indicated in Figs. 11 and 12. At each end of a cutter-bar $35^a$, upon which the knives are mounted, a chain or other flexible connection 37 is secured, which passes over a pulley 38 and is connected to a rod 39, which reciprocates in guides 40 and is operated by means of a link 41 attached to an eccentric or crank 42, which in turn is operated by means of the two shafts 43 and $43^a$. The roller or pulley 38 is pivoted to a frame $38^a$, which is guided in a frame $38^b$ upon the header and is provided with a spring $38^c$ for normally forcing the roller outwardly in its elongated bearing $38^d$.

It will be observed that the two cranks 42 at opposite ends of the header are set at one hundred and eighty degrees apart. This permits the use of the flexible connection 37 and provides for drawing the knives forward by means of one crank and then drawing them backward by means of the other, so that the cranks work alternately and on half-stroke only.

The shaft 43 is provided with a sprocket-wheel 44, over which runs a chain 45, meshing with a sprocket-wheel 46, revolubly mounted upon the shaft 31. This sprocket-wheel 46 is integrally connected with a second sprocket-wheel 47, over which runs a sprocket-chain 48, which is connected with the shaft of the motor by means of a sprocket-wheel 49.

50 is a combination drive-pulley and clutch mounted upon the shaft 6, upon which the motor is also mounted. This pulley is designed for connecting the motor directly with the threshing-machine, which is not illustrated and which may be of any ordinary or desired construction. This threshing-machine is mounted upon the frame 1 and forms a part of the combination. It will be observed that upon the throwing out of the clutch 50 this drive-pulley and sprocket-wheel 49 will be rendered inoperative, and although the machine will be caused to travel over the surface of the ground in either direction the harvesting devices and the thresher will remain stationary upon the machine; also, that upon throwing in the clutch the harvesting devices and thresher will be put into operation without interfering with the operation of the driving-wheels 4, which may be run in either direction without affecting the direction of motion of the rest of the machine. Another clutch $50^a$ is provided on the shaft 11 for permitting the motor to start without any load, if desired.

The two shafts 43 and $43^a$ are in line with each other and are designed to be operated simultaneously in the same direction at all times. Upon the shaft 43 is a pinion 51, meshing with a pinion 52 upon a counter-shaft 53, which extends to the shaft $43^a$ and is provided with a pinion 54, meshing with a pinion 55 upon the shaft $43^a$, which meshes with a pinion 56 upon another shaft 57. Upon the shaft 53 is a roller $53^a$, about which passes an endless conveyer 59. This conveyer passes over another roller 60, located at the outside of the header near the knives. The direction of rotation of the shaft 53 is such as to cause the upper part of the conveyer to move inwardly toward the motor, so as to draw the material deposited thereon toward the center of the machine. The shaft 57 is provided with a roller 57ª, (shown in Fig. 6,) upon which a positive conveyer 61 is designed to run. This conveyer is a double one, as shown in Fig. 2, and is located in a frame 62. For convenience in distinguishing this conveyer from the others which form a portion of the machine it will hereinafter be designated as the "elevator," as that is the purpose for which it is intended.

Upon the end of the shaft 57 is a bevel-gear 63, which is designed to engage with another bevel-gear attached to a shaft running up the side of the elevator and coöperating with a roller at the upper end thereof. These parts being common are not illustrated in the drawings.

It will be understood that the two conveyers which together constitute the elevator 61 are both of the belt type and pass over rollers (not shown) near the bottom of the elevator. The upper one of these rollers is on a shaft 62ª, which passes through a slot 61ª, so that it can yield when a bunch of grain enters. The shaft 57 is provided with a bushing 64, which is secured to the elevator-frame 62 and is rotatably mounted in the header-frame 34. The purpose of this construction is to permit the elevator to have a pivotal motion with respect to the header 34. This is necessitated by two conditions, which will be explained later.

Upon the shafts 43 and 43ª are bevel-gears 65, meshing with bevel-gears 66 upon shafts 67. These shafts carry rollers 67ª, (see Fig. 1,) over which run endless conveyers 68. These conveyers are each provided with a roller 68ª near the center of the machine. It will be obvious that the operation of the shafts 43 and 43ª will rotate the rollers 67ª and cause the two endless conveyers to travel about their upper surfaces, constantly receding toward the conveyer 59, so that they will deposit material cut by the knives upon this conveyer 59. Near the end of the shaft upon which the rollers 68ª are mounted pinions 69 are secured. These mesh with idler-pinions 70, which in turn mesh with pinions 71, which operate rollers 71ª, the function of which is to assist the operation of carrying the material from the conveyers 68 to the conveyer 59.

72 is a sprocket-wheel located upon the inner end of the shaft 43 and engaging with a sprocket-chain 73, which operates sprocket-wheel 74 upon a sleeve 75, as indicated in Fig. 4. This sleeve is rotatably mounted upon a shaft 75ª, which is mounted on a frame 76. An auxiliary frame 76ª is pivotally mounted by the shaft 75ª on the frame 76.

77 is a sprocket-wheel fixedly mounted upon the sleeve 75 and engaging with a sprocket-chain 78, which meshes with and operates a sprocket-wheel 79 upon a shaft 80. Upon this shaft is a fast or force feeding device 81, which consists of a cylinder provided with a series of teeth extending outwardly from the cylinder, but in an inclined direction to the surface thereof. These teeth are inclined backward for the reason that in feeding hay, shocks of grain, and similar materials the teeth will force the material along, but will not become clogged by it, having no tendency to carry it around the cylinder.

Upon each end of the shaft 80 is a bevel-gear 82, meshing with another bevel-gear 83, mounted upon an inclined shaft 84, which carries at its other end a toothed wheel 85. These toothed wheels will operate simultaneously with the force-feeding device proper and will assist in forcing the material from the conveyer 59 to the elevator 61. In order to avoid clogging of the material as it passes the corners of the frame, a pair of loosely-mounted rollers 86 are placed in a vertical position near the frame at the point at which the material would tend to clog the machine.

87 is a lever rigidly mounted upon the shaft 75ª and provided with a link 88, extending up into the cab, so that it may be operated therefrom. It is connected to a link 89 by means of a projection 90 upon the lever 87. This projection 90 and lever 87 constitute a bell-crank, and the former is provided with a slot 91 for permitting the desired motion of the link 89. This link is journaled in a bearing 92, secured in the frame 76, and is provided with an extension 93, adapted to engage with a clutch 94, mounted upon the shaft 43. This shaft is provided with a stationary end piece 95 and a spring 96 for normally forcing the clutch member 94 into engagement with an element 97, secured to the sprocket-wheel 72. It will be obvious that upon the shifting of the link 88 and the consequent turning of the bell-crank 87 90 the clutch will be caused to engage with or disengage from the sprocket-wheel 72. Consequently when the force-feeding device is raised upon its pivot 75ª it will automatically be thrown out of operation, and when it is lowered sufficiently to be brought in proper position for operation the two members of the clutch will be thrown into engagement with each other, and the rotating part 94 will cause the other part 97, and consequently the sprocket-wheel 72, to rotate. This will of course cause the fast-feeding device to be put into operation.

Upon the outer ends of each of the shafts 43 and 43ª is mounted a sprocket-wheel 98. These sprocket-wheels may be in one piece with the cranks 42, if desired, as indicated in the figures. A chain 99 meshes with each of these sprocket-wheels and drives a sprocket-wheel 100, which is mounted integrally with respect to another sprocket-wheel 101, which is mounted on a frame 102, bolted to the header 34. Another chain 103 is driven from sprocket-wheel 101 and operates a sprocket-wheel 104 upon a shaft 105. Upon this shaft is mounted a reel 106, which is provided with vanes 107 and with a center piece 108 for the purpose of feeding or forcing the material as it is cut backwardly from the knives upon the conveyers 68 and 59. The center piece 108 is designed for the purpose of securing a firm support for the vanes and frame of the reel.

109 is a link pivoted to the header 34 and provided with a pin 110, adapted to be placed in any one of the holes 111, located in an arm 111$^a$, which is pivoted to the frame 102, as indicated in Fig. 10. The purpose of this arrangement is to provide for the adjustment of the reel up and down, according to the conditions prevailing and permitting the reel to assume a proper position for different kinds of grain and different kinds of land. The shaft may also be adjustable lengthwise of the arm 111$^a$.

As was stated above, the header is pivotally mounted upon the frame 1 by means of the shaft 31 and is counterbalanced by means of the springs 32. In order to provide for raising and lowering the header upon its pivot, a segmental gear 112 is fixedly mounted with respect to the hangers 33 and concentrically with respect to the shaft 31. This segmental gear is designed to be operated by means of a worm-wheel 113, mounted on a shaft 114, which has two bearings, one, 115, upon the frame 1, and the other, 116, in the cab 22. At the end of the shaft 114 is located a hand-wheel 117 or equivalent operating device. It will be readily seen that this arrangement provides for the ready and efficient operation of the hanger to raise and lower it according to the ground and character of material operated upon and that the springs 32 assist in the upward movement of the hanger in this manner.

As illustrated in Figs. 1 and 2, the machine is designed to cut grain or other material in its advance, the reel being operated to force the material over upon the conveyers, and the conveyers being operated toward the center of the machine to carry the cut material to the central conveyer 59, which, either with or without the operation of the force-feed, will carry the material to the elevator 61. This elevator is designed to raise the material and deposit it in the thresher, which is preferably located at the rear of the elevator. It will be obvious that upon the adjustment of the header up and down upon its pivot the elevator, if rigidly located with respect to the header, will swing toward and away from the thresher, so that in the lower position of the header it would not deliver into the thresher. For the purpose of overcoming this objection the elevator is pivotally mounted, as indicated in Figs. 5 and 6, the construction of the means for mounting it in this manner having been described. This machine, however, may be used in other ways. The elevator may be placed at one end of the header in such a manner as to permit the whole device to be used to load the material directly into a wagon located at the end of the header. It may also be used in a stationary position to convey material from a pile or stack to a wagon located at one end of the header. When it is desired to use the machine for either of the two last-mentioned purposes, the conveyer 59 is entirely removed, which may be readily done by unbolting the portion of the frame carrying the rollers upon which this conveyer is mounted. The elevator 61 is then removed from its position, as shown in Figs. 1 and 2, and placed at the end of the machine, preferably at the left-hand end, as indicated in Fig. 5. For the purpose of accomplishing this result the bevel-gear 65 and sprocket-wheel 42 are removed from the shaft 43, and it is moved along in its bearings toward the right until its end can be coupled to the end of the shaft 43$^a$. The gears on the right end of the shaft 43 are capable of sliding to the left to permit this. Couplings 118 are provided to attach to the shaft 43 a short piece of shafting 43$^b$ and the shaft 43$^a$. (Shown in Fig. 14.) The bevel-gear 65 and sprocket-wheel 42 are placed on the shaft 43$^b$ and serve the same purpose as before. The shaft 43 is provided with a second bevel-gear 119, designed to mesh with a bevel-gear 120 to be placed on the elevator in place of the spur-gear 56. The two conveyers 68 are disconnected at some point in their length and spliced by the insertion of an extra piece, so that the two conveyers will together constitute a single conveyer operating the whole length of the header and driven at both ends by means of the bevel-gears 65 and 66. The shaft 53 remains on the elevator, but has no function at this time.

For the purpose of conveniently removing the conveyer 59 a frame 34$^a$ is bolted to the header, and a bearing-frame 34$^b$, supporting the roller 60, is bolted to that. It will readily be seen that this provides for the ready removal of the conveyer 59 by the simple operation of unbolting these frames and removing it from the header.

Figs. 5 and 14 indicate the manner in which the left-hand end of the header will appear when the device is connected up in this manner. It will be understood that the conveyer 68 is feeding to the elevator 61. The pivoting of the elevator-frame 62 by means of the bushing 64 to the outer frame 34$^c$, as illustrated in Figs. 5 and 6, is necessary in this use of the device, for the reason that the wagon might assume different positions with respect to the machine, and consequently the upper end of the elevator would have to be free to move with respect to the machine. This pivoting of the elevator provides for this.

While I have illustrated and described a particular form in which my invention is capable of being embodied, it will be obvious that it may be embodied in many other forms and that many modifications may be made without departing from the spirit of my invention and that the latter is not strictly limited to the forms shown and described. The scope of the invention is indicated in the appended claims.

Having thus described my invention, I claim as new and desire to secure by Letters Patent—

1. In a harvester, the combination of a frame, drive-wheels journaled thereon, a motor, a shaft connected with the motor, means for connecting said shaft with the drive-wheels, harvesting devices connected with the frame, a clutch on the motor-shaft for connecting said harvesting devices with and disconnecting them from said shaft, and a thresher-pulley rigidly mounted with respect to said clutch.

2. The combination of a frame, a motor mounted thereon, a cutter, a reel located adjacent to the cutter, conveyers arranged to deliver from the ends of the cutter toward its center, means for conveying material from said conveyers, a force-feeding device for assisting the transfer of material from said conveyers, means for moving the force-feeding device out of operative position, and means for operating said conveyers and said force-feeding device.

3. The combination of a frame, a motor mounted thereon, a cutter, conveyers arranged to deliver from the ends of the cutter toward its center, means for conveying material from said conveyers, a force-feeding device pivotally mounted with respect to said frame for assisting the transfer of material from said conveyers, means for swinging the force-feeding device about its pivot out of operative position, and means for operating said conveyers and said force-feeding device.

4. The combination of a frame, a motor mounted thereon, a cutter, conveyers arranged to deliver from the ends of the cutter toward its center, means for conveying material from said conveyers, a force-feeding device for assisting the transfer of material from said conveyers, means for moving the force-feeding device out of operative position, and means for operating said conveyers and said force-feeding device.

5. The combination of a frame, a motor mounted thereon, a cutter, conveyers arranged to deliver toward the center of said cutter, an elevator located near the center of the cutter, an auxiliary conveyer for moving material from said first-named conveyers to said elevator, a force-feeding device for assisting the transfer of the material from said conveyers to said elevator, and means for operating said conveyers, elevator and force-feeding device from the motor.

6. The combination of a frame, a motor mounted thereon, a cutter, conveyers arranged to deliver toward the center of said cutter, an elevator located near the center of the cutter, an auxiliary conveyer for moving material from said first-named conveyers to said elevator, a force-feeding device for assisting the transfer of the material from said conveyers to said elevator, means for operating said conveyers, elevator and force-feeding device from the motor, and means for moving the force-feeding device out of position, and automatically throwing it out of operative connection with the motor.

7. The combination of a frame, a motor, a harvesting device, means for conveying material from the harvesting device operable from the motor, a force-feeding device for assisting in so conveying material, means for moving the force-feeding device out of operative position and means for throwing the force-feeding device out of operative connection with the motor when it is moved out of operative position.

8. The combination of a harvesting device, means for conveying material from the harvesting device, a force-feeding device located adjacent to said means, a pivoted frame upon which said force-feeding device is mounted, means for swinging said last-mentioned frame upon its pivot, a clutch connected with the force-feeding device and mechanism for throwing the clutch when said pivoted frame is swung about its pivot.

9. The combination of a harvesting device, means for conveying material therefrom, a rotary force-feeding device having inclined teeth and located adjacent to said means, a pivoted frame upon which said force-feeding device is mounted, and means for swinging said last-mentioned frame upon its pivot toward and from said first-named means.

10. The combination of a frame, a motor, a harvesting device, means for conveying material from the harvesting device, a force-feeding device for assisting in so conveying material connected with the motor, and means for moving the force-feeding device out of operative position and automatically throwing it out of operative connection with the motor.

11. The combination of a frame, a motor, a harvesting device, means for conveying the material from the harvesting device, a force-feeding device located adjacent to said means, and operatively connected with the motor a pivoted frame upon which said force-feeding device is mounted, and means for swinging said last-mentioned frame upon its pivot and automatically throwing the force-feeding device out of operative connection with the motor, said means comprising a clutch and mechanism for throwing the clutch when said pivoted frame is moved about its pivot.

12. The combination of a frame, a motor, harvesting devices, a shaft mounted on said frame, a second frame pivoted about the axis of said shaft, a shaft connected with said motor, connections between the motor-shaft and the first-named shaft, a force-feeding device mounted on said pivoted frame, connections between the first-named shaft and the force-feeding device, a clutch on the first-named shaft, and automatic means for throwing the clutch when said pivoted frame is moved about its pivot.

13. The combination of a frame, a motor mounted thereon, harvesting devices upon the frame, a shaft mounted upon the frame, a second frame pivotally mounted with respect to the axis of said shaft, a motor-shaft connected with the motor, means for connecting said shafts with each other, a force-feeding device mounted upon said pivoted frame, a clutch mounted upon the first-mentioned shaft and adapted to throw the force-feeding device out of operative connection with the motor, a bell-crank mounted upon the pivoted frame and connected with said clutch, and a lever connected with the pivoted frame and with the clutch.

14. The combination of a frame, a motor, harvesting devices connected with the motor, a second frame pivoted with respect to the first frame, a force-feeding device mounted upon said pivoted frame, means for moving the force-feeding device out of operative position and means for connecting said force-feeding device with the motor, said force-feeding device comprising a rotatable toothed cylinder.

15. In a harvester, the combination of harvesting devices, means for operating them, a pivoted frame, a sprocket-wheel concentrically mounted with respect to the pivot of said frame, a chain engaging with said sprocket-wheel, a toothed cylinder, means for connecting said cylinder to said chain, a toothed disk rotatably mounted on an axis at an angle to the axis of said cylinder, and means for connecting said cylinder and disk, whereby they will rotate in unison.

16. The combination of a frame, a motor mounted thereon, harvesting devices, means for connecting said harvesting devices with the motor, conveyers for delivering material from said harvesting devices, an elevator located near said conveyers, an auxiliary conveyer for transferring material from said first-mentioned conveyer to said elevator, a force-feeding device located adjacent to said auxiliary conveyer, rollers located between the first-named conveyers and the auxiliary conveyers, and idle rollers located between the auxiliary conveyer and the elevator.

17. The combination of a frame, a motor mounted thereon, harvesting devices, conveyers for delivering material toward the center of said harvesting devices, a force-feeding device for assisting in transferring material from said conveyers, rollers located between the conveyers and the force-feeding device, and means for rotating said rollers in unison with the movements of the conveyer.

18. The combination of a frame, supporting-wheels journaled thereon, a motor mounted on the frame, a cutter, conveyers for delivering material toward the center of the cutter, an elevator located near the center of the cutter, an auxiliary conveyer for transferring material from said first-named conveyers to said elevator, a force-feeding device for assisting the transferring operation, and rollers located between the first-named conveyers and the auxiliary conveyer.

19. The combination of a frame, a motor mounted thereon, harvesting devices, conveyers for delivering material from the harvesting devices, an elevator located near said conveyers, an auxiliary conveyer for transferring material from the first-named conveyers to the elevator, rollers located between the first-named conveyers and the auxiliary conveyer, and idler-rollers located between the auxiliary conveyer and the elevator.

20. The combination of a frame, a motor mounted thereon, a header, a cutter mounted on the header, an elevator, means for removably attaching the elevator to the header near its center, means for removably attaching the elevator to the header near one end thereof, and means for operating the cutter and elevator from the motor.

21. The combination of a frame, a motor mounted thereon, a header, an elevator, means for removably attaching the elevator to the header near its center and at its end, and means for operating the elevator from the motor.

22. The combination of a frame, a motor mounted thereon, a header, a cutter mounted on the header, conveyers on the header, an elevator, means for attaching the elevator to the header at a point near its center, means for attaching the elevator to the header near the end thereof, and connections from the motor to the cutter, the conveyers and the elevator for operating them.

23. The combination of a frame, a motor mounted thereon, a header, a cutter mounted on the header, conveyers on the header, means for connecting the conveyers with the motor, means for operating the conveyers on the header to convey material to the center of the header, an elevator, means for attaching the elevator to the header at a point near its center, means for attaching the elevator to the header near the end thereof, and connections from the motor to the cutter and to the elevator.

24. The combination of a frame, a motor mounted thereon a header, a harvesting device mounted on the header, conveyers on the header, an elevator, means for conveying material from the conveyers to the elevator, means for attaching the elevator to the header at a point near its center, said means comprising a bushing mounted upon the frame of the elevator and a shaft connected with the elevator and passing through said bushing, said bushing being rotatably mounted with respect to the header, means for attaching the elevator to the header near the end thereof, and connections from the motor to the harvesting devices, the conveyers and the elevator.

25. A harvesting-machine, comprising a frame, a motor mounted thereon, driving-wheels journaled on the frame, connections from the motor to the driving-wheels for operating the latter, said connections comprising a reversing-gear, a lever for operating said reversing-gear, and a cab provided with a stationary rod and with a plate having a pair of slots located at an angle to each other, said lever having a slot through which said rod passes, and said lever in turn passing through the slots in said plate.

26. A harvesting-machine comprising a frame, a motor mounted thereon, driving-wheels journaled on the frame, connections from the motor to the driving-wheels for operating the latter, said connections comprising an axially-movable gear, a second gear rotatable on a stationary axis, a frame pivoted on the axis of said axially-movable gear, a third gear mounted on said frame and a lever for swinging said frame upon its pivot, and a cab provided with a stationary rod and with a plate having a pair of slots located at an angle to each other, said lever having a slot through which said rod passes and passing through these slots in said plate.

27. A harvesting-machine comprising a motor, a shaft on which said motor is mounted, wheels for supporting the machine, connections from the shaft to the wheels for propelling the machine, said connections comprising a train of gearing having a reversing device, harvesting devices, a driving element on said shaft, connections from said driving element to the harvesting devices, a pulley mounted in stationary relation to said driving element, and a clutch on the shaft between the driving element and the motor.

28. A harvesting-machine comprising a frame, a motor, wheels journaled on said frame, a header pivotally attached to the frame, means for swinging the header upon its pivots, comprising a segmental rack attached to the header and a worm-wheel meshing with the rack, harvesting devices mounted upon the header, connections from the motor to the harvesting devices, and connections from the motor to said wheels for driving the latter, said last-named connections comprising a reversing device consisting of an axially-movable gear, a gear rotatable on a stationary axis and a third gear adapted to mesh with either of said first-named gears.

29. A harvesting-machine comprising a frame, a motor, a header pivotally attached to the frame, means for swinging the header upon its pivots comprising a segmental rack attached to the header, a worm-wheel meshing with the rack and means for operating the worm-wheel, springs for counterbalancing the header with respect to the frame, supporting-wheels for the frame, and means for connecting said motor to the wheels comprising a reversing device.

30. A harvesting-machine comprising a frame, a motor, wheels journaled on said frame, a header pivotally attached to the frame, means for swinging the header upon its pivots comprising a segmental rack attached to the header and a worm-wheel meshing with the rack, harvesting devices mounted upon the header, connections from the motor to the harvesting devices, connections from the motor to said wheels for driving the latter, said last-named connections comprising a reversing device consisting of an axially-movable gear, a gear rotatable on a stationary axis and a third gear adapted to mesh with either of said first-named gears, a shaft mounted on said header, connections from the motor to the shaft, a cutting device mounted on the header, and means for connecting said shaft to the cutting device for operating the latter.

31. A harvesting-machine comprising a frame, a motor, wheels journaled on said frame, a header pivotally attached to the frame, means for swinging the header upon its pivots, comprising a segmental rack attached to the header and a worm-wheel meshing with the rack, harvesting devices mounted upon the header, connections from the motor to the harvesting devices, connections from the motor to said wheels for driving the latter, said last-named connections comprising a reversing device consisting of an axially-movable gear, a gear rotatable on a stationary axis and a third gear adapted to mesh with either of said first-named gears, two shafts mounted in alinement on said header, means for connecting said shafts to cause them to revolve simultaneously, a crank on each shaft, said cranks being set at one hundred and eighty degrees to each other, a cutting device, and means for connecting said cranks to said cutting device.

32. A harvesting-machine comprising a frame, a motor, wheels journaled on said frame, a header pivotally attached to the frame, means for swinging the header upon its pivots, comprising a segmental rack attached to the header and a worm-wheel meshing with the rack, harvesting devices mounted upon the header, connections from the motor to the harvesting devices, connections from the motor to said wheels for driving the latter, said last-named connections comprising a reversing device consisting of an axially-movable gear, a gear rotatable on a stationary axis and a third gear adapted to mesh with either of said first-named gears, two shafts mounted in alinement on said header, means for connecting said shafts together to cause them to revolve simultaneously, a crank on each shaft at the outer ends thereof, said cranks being situated at one hundred and eighty degrees to each other, a link connected to each crank, a chain connected to each link, and a cutter-bar connected at its opposite ends to said chains.

33. A harvesting-machine, comprising a frame, a motor, wheels journaled on the frame, a header pivotally attached to the frame, means for swinging the header upon its pivots comprising a segmental rack attached to the header and the worm-wheel meshing with the rack, harvesting devices mounted upon the header, connections from the motor to the harvesting devices, connections from the motor to said wheels, two shafts mounted in alinement on said header, means for connecting said shafts together to cause them to rotate simultaneously, a crank on each shaft at the outer ends thereof, said cranks being situated at an angle of one hundred and eighty degrees to each other, a link connected with each crank, a chain connected with each link, and a cutter-bar connected at its opposite ends to said chains.

34. A harvesting-machine, comprising a frame, a motor, wheels journaled on said frame, a header connected with the frame, connections from the motor to said wheels for driving them, two shafts mounted in alinement on the header, means for connecting said shafts together to cause them to rotate simultaneously, a crank on each shaft at the outer ends thereof, said cranks being set at an angle to each other, a link connected to each crank, a chain connected with each link, and a cutter-bar connected at its opposite ends with said chains.

35. A harvesting-machine comprising a frame, a motor, a header connected with said frame, two shafts mounted in alinement on said header, means for connecting said shafts to cause them to rotate simultaneously, means for connecting said shafts with the motor, a crank on each shaft, a cutting device, and means for connecting said cranks with said cutting device.

36. A harvesting-machine, comprising two shafts mounted in alinement, means for connecting said shafts together, a crank on each shaft, a cutting device, and means for connecting said cranks with said cutting device; said last-named means comprising two movable pulleys mounted near the opposite ends of said cutting device, a chain passing over each pulley and connected with the opposite ends of the cutting device, and connections between each chain and the corresponding crank.

37. A harvesting-machine, comprising a frame, a motor, a header connected with said frame, two shafts mounted in alinement on said header, means for connecting said shafts to cause them to rotate simultaneously, means for connecting said shafts with the motor, a crank on each shaft, a cutting device, and means for connecting said cranks with said cutting device; said last-named means comprising a pulley mounted upon each end of the header, a chain passing over each pulley and connected to the opposite ends of the cutting device, and connections between each chain and the corresponding crank.

38. A harvesting-machine, comprising a frame, a motor thereon, a header connected with the frame, a second frame pivoted to said header, said frame being provided with a series of perforations, a link pivotally connected with the header, a pin mounted on said link and adapted to be engaged in any one of the perforations of said pivoted frame, whereby said frame may be adjusted about its pivot with respect to the header, a reel rotatably mounted upon the pivoted frame, a shaft mounted concentrically with respect to the pivot of said pivoted frame, means for driving said shaft from the motor, and means for connecting said shaft with the reel.

39. A harvesting-machine comprising a frame, a motor thereon, a header, two shafts mounted in alinement on said header, means for driving both the said shafts simultaneously from said motor, a cutter and a reel on said header, a sprocket-wheel on each of said shafts, a sprocket-wheel on said reel, and means for connecting said sprocket-wheels.

40. A harvesting-machine comprising a main frame, a motor mounted thereon, driving-wheels journaled on said main frame, means for operatively connecting said motor to said driving-wheels comprising a reversing mechanism, a shaft journaled on said main frame, a header pivotally mounted with respect to said shaft, a pair of shafts on said header, means for driving said shafts simultaneously in the same direction from said motor, a cutting device, means for operating said cutting device from said shafts on the header, a reel, means for driving said reel from said shafts on the header, a conveyer on the header, means for driving said conveyer, an elevator, and means for driving said elevator from one of said shafts on the header.

41. A harvesting-machine comprising a main frame, a motor mounted thereon, driving-wheels journaled on said main frame, means for operatively connecting said motor to said driving-wheels comprising a reversing mechanism, a shaft journaled on said main frame, a header pivotally mounted with respect to said shaft, a pair of shafts on said header, means for driving said shafts simultaneously in the same direction from said motor, a cutting device, means for operating said cutting device from said shafts on the header, a reel, means for driving said reel from said shafts on the header, a conveyer on the header, means for driving said conveyer, an elevator, means for driving said elevator from one of said shafts on the header, a force-feeding device pivotally mounted with respect to said header, and means for automatically connecting said force-feeding device with the motor when the force-feeding device is swung in one direction upon its pivots.

42. A harvesting-machine comprising a main frame, a motor mounted thereon, driving-wheels journaled on said main frame, means for operatively connecting said motor to said driving-wheels comprising a reversing mechanism, a shaft journaled on said main frame, a header pivotally mounted with respect to said shaft, a pair of shafts on said header, means for driving said shafts simultaneously in the same direction from said motor, a cutting device, means for operating said cutting device from said shafts on the header, a reel, means for driving said reel from said shafts on the header, an elevator, means for driving said elevator from one of said shafts on the header, a force-feeding device pivotally mounted with respect to said header, and means for automatically connecting said force-feeding device with the motor when the force-feeding device is swung in one direction upon its pivots, said means comprising a bell-crank, a lever connected to said bell-crank and a clutch connected to said lever.

In testimony whereof I have signed my name to this specification in the presence of two subscribing witnesses.

JESSE JEREMIAH TROEGER.

Witnesses:
  EDWARD F. TROEGER,
  GEORGE E. TROEGER.